(12) United States Patent
Gao et al.

(10) Patent No.: US 11,239,887 B2
(45) Date of Patent: Feb. 1, 2022

(54) DATA TRANSMISSION METHOD AND DEVICE

(71) Applicant: CHINA ACADEMY OF TELECOMMUNICATIIONS TECHNOLOGY, Beijing (CN)

(72) Inventors: Qiubin Gao, Beijing (CN); Shanzhi Chen, Beijing (CN); Wenhong Chen, Beijing (CN); Runhua Chen, Beijing (CN); Hui Li, Beijing (CN); Rakesh Tamrakar, Beijing (CN); Shaohui Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 284 days.

(21) Appl. No.: 16/082,527

(22) PCT Filed: Feb. 27, 2017

(86) PCT No.: PCT/CN2017/074976
§ 371 (c)(1),
(2) Date: Sep. 5, 2018

(87) PCT Pub. No.: WO2017/152789
PCT Pub. Date: Sep. 14, 2017

(65) Prior Publication Data
US 2019/0028157 A1    Jan. 24, 2019

(30) Foreign Application Priority Data

Mar. 11, 2016 (CN) .......................... 201610140777.7

(51) Int. Cl.
*H04B 7/0456* (2017.01)
*H04L 5/00* (2006.01)
(Continued)

(52) U.S. Cl.
CPC ............. *H04B 7/0456* (2013.01); *H04B 7/04* (2013.01); *H04B 7/0626* (2013.01);
(Continued)

(58) Field of Classification Search
CPC . H04L 1/0031; H04L 13/08; H04L 25/03898; H04L 1/0026; H04L 25/03942;
(Continued)

(56) References Cited

U.S. PATENT DOCUMENTS 9,166,659 B2   10/2015  Nammi
2008/0192718 A1  8/2008  Jongren et al.
(Continued)

FOREIGN PATENT DOCUMENTS

CN    101136718 A    3/2008
CN    101146078 A    3/2008
(Continued)

OTHER PUBLICATIONS

International Search Report for PCT/CN2017/074976 dated Jun. 6, 2017 and its English translation provided by WIPO.
(Continued)

*Primary Examiner* — Romani Ohri
(74) *Attorney, Agent, or Firm* — Ladas & Parry, LLP

(57) ABSTRACT

A data transmission method and a data transmission device are provided. The data transmission method includes steps of: determining, by a transmitting end, a first precoding matrix and a second precoding matrix, the first precoding matrix being selected from a predefined first codebook, the second precoding matrix being acquired on the basis of CSI; performing, by the transmitting end, precoding processing on a data stream in accordance with the first precoding matrix and the second precoding matrix; and transmitting, by the transmitting end, the data streamed acquired after the precoding processing to a receiving end.

8 Claims, 3 Drawing Sheets

(51) Int. Cl.
*H04B 7/04* (2017.01)
*H04L 25/02* (2006.01)
*H04B 7/06* (2006.01)

(52) U.S. Cl.
CPC .......... *H04L 5/0044* (2013.01); *H04L 5/0048* (2013.01); *H04L 25/0224* (2013.01); *H04L 5/005* (2013.01); *H04L 5/0023* (2013.01); *H04L 5/0053* (2013.01); *H04L 5/0057* (2013.01)

(58) Field of Classification Search
CPC ........ H04L 2025/03426; H04L 5/0051; H04B 7/00619; H04B 7/0456; H04W 28/14
See application file for complete search history.

(56) References Cited

U.S. PATENT DOCUMENTS

| | | | |
|---|---|---|---|
| 2010/0046461 A1 | 2/2010 | Wennstrom | |
| 2011/0134859 A1* | 6/2011 | Li | H04B 7/0452 370/329 |
| 2012/0039369 A1* | 2/2012 | Choi | H04B 7/0639 375/219 |
| 2012/0201282 A1* | 8/2012 | Li | H04L 25/03343 375/219 |
| 2013/0148755 A1* | 6/2013 | Melzer | H04B 7/0417 375/267 |
| 2014/0177745 A1* | 6/2014 | Krishnamurthy | H04B 7/0413 375/267 |
| 2014/0348075 A1 | 11/2014 | Kim et al. | |
| 2015/0195020 A1 | 7/2015 | Zhu et al. | |
| 2016/0065282 A1* | 3/2016 | Zhang | H04B 7/0617 370/281 |
| 2016/0254848 A1 | 9/2016 | Onggosanusi et al. | |
| 2016/0344458 A1 | 11/2016 | Zhao et al. | |
| 2017/0141826 A1 | 5/2017 | Kim et al. | |
| 2017/0149549 A1 | 5/2017 | Wang et al. | |
| 2017/0245297 A1* | 8/2017 | Wild | H04L 65/4069 |
| 2017/0250743 A1* | 8/2017 | Jongren | H04B 7/0617 |

FOREIGN PATENT DOCUMENTS

| | | |
|---|---|---|
| CN | 101669297 A | 3/2008 |
| CN | 104579586 A | 4/2015 |
| CN | 104811229 A | 7/2015 |
| CN | 105306174 A | 2/2016 |
| JP | 2010521078 A | 6/2010 |
| JP | 2013168751 A | 8/2013 |
| KR | 20120086286 A | 8/2012 |
| WO | 2014190903 A1 | 12/2014 |
| WO | 2015054879 A1 | 4/2015 |
| WO | 2015103612 A1 | 7/2015 |
| WO | 2015199262 A1 | 12/2015 |

OTHER PUBLICATIONS

Written Opinion of the International Search Authority PCT/CN2017/074976 dated Jun. 6, 2017 and its English translation provided by Google Translate.
Notification of Reason for Refusal from KR app. No. 2018-7028388, dated Jan. 20, 2020, with English translation from KIPO.
Extended European Search Report from EP app. No. 17762475.6, dated Feb. 18, 2019.
Written Opinion of the International Searching Authority, from PCT/CN2017/074976, dated Jun. 6, 2017, with English translation from WIPO.
International Preliminary Report on Patentability from PCT/CN2017/074976, dated Sep. 11, 2018, with English translation from WIPO.
First Office Action and search report from CN app. No. 201610140777.7, dated Sep. 23, 2019, with English translation from Global Dossier.
Notice of Reasons for Refusal from JP app. No. 2018547475, dated Oct. 8, 2019, with English translation from Global Dossier.

* cited by examiner

DATA TRANSMISSION METHOD AND DEVICE

CROSS-REFERENCE TO RELATED APPLICATIONS

The present application is the U.S. national phase of PCT Application No. PCT/CN2017/074976 filed on Feb. 27, 2017, which claims priority to the Chinese patent application No. 201610140777.7 filed before the SIPO on Mar. 11, 2016, which are incorporated herein by reference is their entireties.

TECHNICAL FIELD

The present disclosure relates to the field of communication technology, in particular to a data transmission method and a data transmission device.

BACKGROUND

Closed-loop precoding technique has been introduced into a Long Term Evolution (LTE) Release 8 (Rel-8) system, so as to improve the spectral efficiency. For the closed-loop precoding technique, it is required to store a same set of precoding matrices in a base station and a User Equipment (UE) in advance, and this set of precoding matrices is called as code book. Upon the estimation of channel information in accordance with a cell common pilot, the UE selects one precoding matrix from the code book in accordance with a predetermined criterion. The predetermined criterion may be maximization of mutual information or maximization of Signal-to-Interference plus Noise Ratio (SINR). An index of the selected precoding matrix in the code book is returned by the UE to the base station via an uplink channel, and this index is called as Precoding Matrix Indicator (PMI). The base station may determine the precoding matrix to be used by the UE in accordance with the received PMI.

For the closed-loop precoding technique, a transmission parameter is selected on the basis of feedback information from the UE, so when the UE moves at a high speed, the PMI returned by the UE may probably be invalid, i.e., it is impossible to reflect a current channel state of the UE. At this time, the transmission parameter may not match an actual channel condition, and the system performance may be deteriorated. In a high-speed movement scenario, an open-loop Multiple Input Multiple Output (MIMO) transmission scheme has been introduced into the LTE Rel-8 system. For the open-loop MIMO transmission scheme, the UE does not return the PMI any more, and instead, it is merely necessary for the UE to return a Channel Quality Indicator (CQI) and a Rank Indicator (RI). When UE calculates the CQI and the RI, it is assumed that the UE uses a pre-agreed precoding matrix on a resource involved in the data transmission.

For the open-loop MIMO transmission scheme defined in the LTE Rel-8 system, a precoding operation is performed completely on the basis of the channel-independent precoding matrix, and it is impossible to adjust the transmission parameter adaptively in accordance with a channel change, so it is impossible to acquire a beamforming gain and a precoding gain.

In a word, it is impossible for the open-loop MIMO transmission scheme to adaptively adjust the transmission parameter in accordance with the channel change, so it is impossible to acquire the beamforming gain and the precoding gain. In addition, for a closed-loop MIMO transmission scheme, due to the invalid information returned by the UE when the UE moves at a high speed, the transmission parameter does not match the actual channel condition, so the system performance may be deteriorated.

SUMMARY

An object of the present disclosure is to provide a method and a device for transmitting feedback information, so as to solve the problems in the related art where it is impossible for the open-loop MIMO transmission scheme to acquire a beamforming gain and a precoding gain due to the fact that the open-loop MIMO transmission scheme is incapable of adaptively adjusting the transmission parameter in accordance with a channel change, and it is impossible for the closed-loop MIMO transmission scheme to prevent the deterioration of the system performance when the transmission parameter does not match the actual channel condition due to the invalid information returned by the UE at a high speed.

In one aspect, the present disclosure provides in some embodiments a data transmission method, including steps of: determining, by a transmitting end, a first precoding matrix and a second precoding matrix, the first precoding matrix being selected from a predefined first codebook, the second precoding matrix being acquired on the basis of Channel State information (CSI); performing, by the transmitting end, precoding processing on a data stream in accordance with the first precoding matrix and the second precoding matrix; and transmitting, by the transmitting end, the data stream acquired after the precoding processing to a receiving end.

In a possible embodiment of the present disclosure, the step of performing, by the transmitting end, the precoding processing on the data stream in accordance with the first precoding matrix and the second precoding matrix includes: performing, by the transmitting end, first-level precoding processing on the data stream in accordance with the first precoding matrix, and performing second-level precoding processing on the data stream acquired after the first-level precoding processing in accordance with the second precoding matrix; or determining, by the transmitting end, a third precoding matrix in accordance with the first precoding matrix and the second precoding matrix, and performing the precoding processing on the data stream in accordance with the third precoding matrix.

In a possible embodiment of the present disclosure, the data transmission method further includes: performing, by the transmitting end, precoding processing on a pilot signal in accordance with the second precoding matrix. The step of transmitting, by the transmitting end, the data stream acquired after the precoding processing to the receiving end includes transmitting, by the transmitting end, the pilot signal acquired after the precoding processing to the receiving end.

In a possible embodiment of the present disclosure, the data transmission method further includes transmitting, by the transmitting end, a control signaling to the receiving end, and the control signaling includes the quantity of ports for the pilot signal and/or the quantity of the data streams.

In a possible embodiment of the present disclosure, the step of determining, by the transmitting end, the first precoding matrix includes: determining, by the transmitting end, dimensions of the first precoding matrix in accordance with the quantity of the data streams; selecting, by the transmitting end, the first code book which includes precoding matrices each having dimensions same to the first precoding matrix in accordance with the dimensions of the first precoding matrix; and with respect to each Resource Element (RE), selecting, by the transmitting end, one to precoding matrix from the selected first code book as the first precoding matrix for the RE.

In a possible embodiment of the present disclosure, the step of determining, by the transmitting end, the dimensions of the first precoding matrix in accordance with the quantity of the data streams includes: determining, by the transmitting end, the quantity of columns of the first precoding matrix as the quantity of the data streams; and determining, by the transmitting end, the quantity of rows of the first precoding matrix in accordance with a predetermined mapping relationship between the quantity of the data streams and the quantity of rows of the first precoding matrix.

In a possible embodiment of the present disclosure, the step of selecting, by the transmitting end, one precoding matrix from the selected first code book as the first precoding matrix for the RE includes: selecting, by the transmitting end, one precoding matrix from the selected first code book as the first precoding matrix in accordance with a serial number of the RE or a serial number of a Resource Block (RB) to which the RE belongs; or selecting, by the transmitting end, one precoding matrix from the selected first code book as the first precoding matrix in accordance with a serial number of a data symbol vector included in the data stream transmitted on the RE.

In a possible embodiment of the present disclosure, for the mapping relationship between the quantity of the data streams and the quantity of the rows of the first precoding matrix, when the quantity of the data streams is 1, the quantity of the rows of the first precoding matrix is 1, and when the quantity of the data streams is greater than 1, the quantity of the rows of the first precoding matrix is a minimum even number greater than or equal to the quantity of the data streams or a minimum value of a power of 2 greater than or equal to the quantity of the data streams.

In a possible embodiment of the present disclosure, the step of determining, by the transmitting end, the second precoding matrix includes: performing, by the transmitting end, channel estimation in accordance with a signal from the receiving end so as to acquire a channel matrix, and determining the second precoding matrix in accordance with the channel matrix; or upon the receipt of the CSI reported by the receiving end, determining, by the transmitting end, the second precoding matrix in accordance with the CSI, the CSI being acquired by the receiving end after measuring a channel from the transmitting end to the receiving end.

In another aspect, the present disclosure provides in some embodiments a data reception method, including steps of: receiving, by a receiving end, a signal from a transmitting end; determining, by the receiving end, a first precoding matrix and a fourth precoding matrix, the first precoding matrix being selected from a predefined first code book, the fourth precoding matrix being acquired on the basis of CSI; and performing, by the receiving end, decoding processing on the received signal in accordance with the first precoding matrix and the fourth precoding matrix, so as to acquire a data stream.

In a possible embodiment of the present disclosure, the step of performing, by the receiving end, the decoding processing on the received signal in accordance with the first precoding matrix and the fourth precoding matrix includes: performing, by the receiving end, first-level decoding processing on the received signal in accordance with the fourth precoding matrix, and performing second-level decoding processing on the signal acquired after the first-level decoding processing in accordance with the first precoding matrix; or determining, by the receiving end, a fifth precoding matrix in accordance with the first precoding matrix and the fourth precoding matrix, and performing the decoding processing on the received signal in accordance with the fifth precoding matrix.

In a possible embodiment of the present disclosure, the step of determining, by the receiving end, the fifth precoding matrix in accordance with the first precoding matrix and the fourth precoding matrix includes determining, by the receiving end, a product of the first precoding matrix and the fourth precoding matrix as the fifth precoding matrix.

In a possible embodiment of the present disclosure, the step of determining, by the receiving end, the fourth precoding matrix includes: performing, by the receiving end, channel estimation on a pilot signal in the received signal, and determining a resultant channel matrix as the fourth precoding matrix; or measuring, by the receiving end, a channel from the transmitting end to the receiving end, and selecting one precoding matrix from a predefined second code book as the fourth precoding matrix in accordance with the resultant CSI; or receiving, by the receiving end, index information from the transmitting end, and determining a precoding matrix in the predefined second code book corresponding to the index information as the fourth precoding matrix in accordance with the index information.

In a possible embodiment of the present disclosure, prior to the step of performing, by the receiving end, the channel estimation on the pilot signal in the received signal, the data reception method further includes receiving, by the receiving end, control signaling from the transmitting end, and the control signaling includes the quantity of ports for the pilot signal and/or the quantity of the data streams.

In a possible embodiment of the present disclosure, the step of determining, by the receiving end, the first precoding matrix includes: determining, by the receiving end, dimensions of the first precoding matrix in accordance with the quantity of the ports for the pilot signal and/or the quantity of the data streams; selecting, by the receiving end, the first code book which includes precoding matrices each having dimensions same to the first precoding matrix in accordance with the dimensions of the first precoding matrix; and with respect to each RE, selecting, by the receiving end, one precoding matrix from the selected first code book as the first precoding matrix for the RE.

In a possible embodiment of the present disclosure, the step of determining, by the receiving end, the dimensions of the first precoding matrix in accordance with the quantity of the ports for the pilot signal and/or the quantity of the data streams includes: determining, by the receiving end, the quantity of columns of the first precoding matrix as the quantity of the data streams; and determining, by the receiving end, the quantity of rows of the first precoding matrix in accordance with a predetermined mapping relationship between the quantity of the data streams and the quantity of the rows of the first precoding matrix.

In a possible embodiment of the present disclosure, for the mapping relationship between the quantity of the data streams and the quantity of the rows of the first precoding matrix, when the quantity of the data streams is 1, the quantity of the rows of the first precoding matrix is 1, and when the quantity of the data streams is greater than 1, the quantity of the rows of the first precoding matrix is a minimum even number greater than or equal to the quantity of the data streams or a minimum value of a power of 2 greater than or equal to the quantity of the data streams.

In a possible embodiment of the present disclosure, the step of selecting, by the receiving end, one precoding matrix from the selected first code book as the first precoding matrix for the RE includes: selecting, by the receiving end, one precoding matrix from the selected first code book as the first precoding matrix for the RE in accordance with a serial number of the RE or a serial number of a RB to which the RE belongs; or selecting, by the receiving end, one precoding matrix from the selected first code book as the first precoding matrix for the RE in accordance with a serial number of a data symbol vector included in the data stream transmitted on the RE.

In yet another aspect, the present disclosure provides in some embodiments a data transmission device, including: a determination module configured to determine a first precoding matrix and a second precoding matrix, the first precoding matrix being selected from a predefined first codebook, the second precoding matrix being acquired on the basis of CSI; a precoding module configured to perform precoding processing on a data stream in accordance with the first precoding matrix and the second precoding matrix; and a transmission module configured to transmit the data streamed acquired after the precoding processing to a receiving end.

In a possible embodiment of the present disclosure, the precoding module is further configured to: perform first-level precoding processing on the data stream in accordance with the first precoding matrix, and perform second-level precoding processing on the data stream acquired after the first-level precoding processing in accordance with the second precoding matrix; or determine a third precoding matrix in accordance with the first precoding matrix and the second precoding matrix, and perform the precoding processing on the data stream in accordance with the third precoding matrix.

In a possible embodiment of the present disclosure, the precoding module is further configured to perform precoding processing on a pilot signal in accordance with the second precoding matrix, and the transmission module is further configured to transmit the pilot signal acquired after the precoding processing to the receiving end.

In a possible embodiment of the present disclosure, the transmission module is further configured to transmit control signaling to the receiving end, and the control signaling includes the quantity of ports for the pilot signal and/or the quantity of the data streams.

In a possible embodiment of the present disclosure, the determination module is further configured to: determine dimensions of the first precoding matrix in accordance with the quantity of the data streams; select the first code book which includes precoding matrices each having dimensions same to the first precoding matrix in accordance with the dimensions of the first precoding matrix; and with respect to each RE, select one precoding matrix from the selected first code book as the first precoding matrix for the RE.

In a possible embodiment of the present disclosure, the determination module is further configured to: determine the quantity of columns of the first precoding matrix as the quantity of the data streams; and determine the quantity of rows of the first precoding matrix in accordance with a predetermined mapping relationship between the quantity of the data streams and the quantity of rows of the first precoding matrix.

In a possible embodiment of the present disclosure, the determination module is further configured to: select one precoding matrix from the selected first code book as the first precoding matrix in accordance with a serial number of the RE or a serial number of a RB to which the RE belongs; or select one precoding matrix from the selected first code book as the first precoding matrix in accordance with a serial number of a data symbol vector included in the data stream transmitted on the RE.

In a possible embodiment of the present disclosure, the determination module is further configured to: perform channel estimation in accordance with a signal from the receiving end so as to acquire a channel matrix, and determine the second precoding matrix in accordance with the channel matrix; or upon the receipt of the CSI reported by the receiving end, determine the second precoding matrix in accordance with the CSI, the CSI being acquired by the receiving end after measuring a channel from the transmitting end to the receiving end.

In still yet another aspect, the present disclosure provides in some embodiments a base station, including a transceiver and at least one processor connected to the transceiver. The processor is configured to read a program stored in a memory, so as to: determine a first precoding matrix and a second precoding matrix, the first precoding matrix being selected from a predefined first codebook, the second precoding matrix being acquired on the basis of CSI; perform precoding processing on a data stream in accordance with the first precoding matrix and the second precoding matrix; and transmit through the transceiver the data streamed acquired after the precoding processing to a receiving end.

In a possible embodiment of the present disclosure, the processor is further configured to: perform first-level precoding processing on the data stream in accordance with the first precoding matrix, and perform second-level precoding processing on the data stream acquired after the first-level precoding processing in accordance with the second precoding matrix; or determine a third precoding matrix in accordance with the first precoding matrix and the second precoding matrix, and perform the precoding processing on the data stream in accordance with the third precoding matrix.

In a possible embodiment of the present disclosure, the processor is further configured to perform precoding processing on a pilot signal in accordance with the second precoding matrix, and transmit through the transceiver the pilot signal acquired after the precoding processing to the receiving end.

In a possible embodiment of the present disclosure, the processor is further configured to transmit through the transceiver control signaling to the receiving end, and the control signaling includes the quantity of ports for the pilot signal and/or the quantity of the data streams.

In a possible embodiment of the present disclosure, the processor is further configured to: determine dimensions of the first precoding matrix in accordance with the quantity of the data streams; select the first code book which includes precoding matrices each having dimensions same to the first precoding matrix in accordance with the dimensions of the first precoding matrix; and with respect to each RE, select one precoding matrix from the selected first code book as the first precoding matrix for the RE.

In a possible embodiment of the present disclosure, the processor is further configured to: determine the quantity of columns of the first precoding matrix as the quantity of the data streams; and determine the quantity of rows of the first precoding matrix in accordance with a predetermined mapping relationship between the quantity of the data streams and the quantity of rows of the first precoding matrix.

In a possible embodiment of the present disclosure, the processor is further configured to: select one precoding matrix from the selected first code book as the first precoding matrix in accordance with a serial number of the RE or a serial number of a RB to which the RE belongs; or select one precoding matrix from the selected first code book as the first precoding matrix in accordance with a serial number of a data symbol vector included in the data stream transmitted on the RE.

In a possible embodiment of the present disclosure, the processor is further configured to: perform channel estimation in accordance with a signal from the receiving end so as to acquire a channel matrix, and determine the second precoding matrix in accordance with the channel matrix; or upon the receipt of the CSI reported by the receiving end through the transceiver, determine the second precoding matrix in accordance with the CSI, the CSI being acquired by the receiving end after measuring a channel from the transmitting end to the receiving end.

In still yet another aspect, the present disclosure provides in some embodiments a data reception device, including: a reception module configured to receive a signal from a transmitting end; a determination module configured to determine a first precoding matrix and a fourth precoding matrix, the first precoding matrix being selected from a predefined first code book, the fourth precoding matrix being acquired on the basis of CSI; and a decoding module configured to perform decoding processing on the received signal in accordance with the first precoding matrix and the fourth precoding matrix, so as to acquire a data stream.

In a possible embodiment of the present disclosure, the decoding module is further configured to: perform first-level decoding processing on the received signal in accordance with the fourth precoding matrix, and perform second-level decoding processing on the signal acquired after the first-level decoding processing in accordance with the first precoding matrix; or determine a fifth precoding matrix in accordance with the first precoding matrix and the fourth precoding matrix, and perform the decoding processing on the received signal in accordance with the fifth precoding matrix.

In a possible embodiment of the present disclosure, the decoding module is further configured to determine a product of the first precoding matrix and the fourth precoding matrix as the fifth precoding matrix.

In a possible embodiment of the present disclosure, the determination module is further configured to: perform channel estimation on a pilot signal in the received signal, and determine a resultant channel matrix as the fourth precoding matrix; or measure a channel from the transmitting end to the receiving end, and select one precoding matrix from a predefined second code book as the fourth precoding matrix in accordance with the resultant CSI; or after the reception module has received index information from the transmitting end, determine a precoding matrix in the predefined second code book corresponding to the index information as the fourth precoding matrix in accordance with the index information.

In a possible embodiment of the present disclosure, the reception module is further configured to receive control signaling from the transmitting end, and the control signaling includes the quantity of ports for the pilot signal and/or the quantity of the data streams.

In a possible embodiment of the present disclosure, the determination module is further configured to: determine dimensions of the first precoding matrix in accordance with the quantity of the ports for the pilot signal and/or the quantity of the data streams; select the first code book which includes precoding matrices each having dimensions same to the first precoding matrix in accordance with the dimensions of the first precoding matrix; and with respect to each RE, select one precoding matrix from the selected first code book as the first precoding matrix for the RE.

In a possible embodiment of the present disclosure, the determination module is further configured to: determine the quantity of columns of the first precoding matrix as the quantity of the data streams; and determine the quantity of rows of the first precoding matrix in accordance with a predetermined mapping relationship between the quantity of the data streams and the quantity of the rows of the first precoding matrix.

In a possible embodiment of the present disclosure, the determination module is further configured to: select one precoding matrix from the selected first code book as the first precoding matrix for the RE in accordance with a serial number of the RE or a serial number of a RB to which the RE belongs; or select one precoding matrix from the selected first code book as the first precoding matrix for the RE in accordance with a serial number of a data symbol vector included in the data stream transmitted on the RE.

In still yet another aspect, the present disclosure provides in some embodiments a User Equipment (UE), including a transceiver and at least one processor connected to the transceiver. The processor is configured to read a program stored in a memory, so as to: receive through the transceiver a signal from a transmitting end; determine a first precoding matrix and a fourth precoding matrix, the first precoding matrix being selected from a predefined first code book, the fourth precoding matrix being acquired on the basis of CSI; and perform decoding processing on the received signal in accordance with the first precoding matrix and the fourth precoding matrix, so as to acquire a data stream.

In a possible embodiment of the present disclosure, the processor is further configured to: perform first-level decoding processing on the received signal in accordance with the fourth precoding matrix, and perform second-level decoding processing on the signal acquired after the first-level decoding processing in accordance with the first precoding matrix; or determine a fifth precoding matrix in accordance with the first precoding matrix and the fourth precoding matrix, and perform the decoding processing on the received signal in accordance with the fifth precoding matrix.

In a possible embodiment of the present disclosure, the processor is further configured to determine a product of the first precoding matrix and the fourth precoding matrix as the fifth precoding matrix.

In a possible embodiment of the present disclosure, the processor is further configured to: perform channel estimation on a pilot signal in the signal received by the transceiver, and determine a resultant channel matrix as the fourth precoding matrix; or measure a channel from the transmitting end to the receiving end, and select one precoding matrix from a predefined second code book as the fourth precoding matrix in accordance with the resultant CSI; or receive through the transceiver index information from the transmitting end, and determine a precoding matrix in the predefined second code book corresponding to the index information as the fourth precoding matrix in accordance with the index information.

In a possible embodiment of the present disclosure, the transceiver is further configured to receive control signaling from the transmitting end, and the control signaling includes the quantity of ports for the pilot signal and/or the quantity of the data streams.

In a possible embodiment of the present disclosure, the processor is further configured to: determine dimensions of the first precoding matrix in accordance with the quantity of the ports for the pilot signal and/or the quantity of the data streams; select the first code book which includes precoding matrices each having dimensions same to the first precoding matrix in accordance with the dimensions of the first precoding matrix; and with respect to each RE, select one precoding matrix from the selected first code book as the first precoding matrix for the RE.

In a possible embodiment of the present disclosure, the processor is further configured to: determine the quantity of columns of the first precoding matrix as the quantity of the data streams; and determine the quantity of rows of the first precoding matrix in accordance with a predetermined mapping relationship between the quantity of the data streams and the quantity of the rows of the first precoding matrix.

In a possible embodiment of the present disclosure, the processor is further configured to: select one precoding matrix from the selected first code book as the first precoding matrix for the RE in accordance with a serial number of the RE or a serial number of a RB to which the RE belongs; or select one precoding matrix from the selected first code book as the first precoding matrix for the RE in accordance with a serial number of a data symbol vector included in the data stream transmitted on the RE.

According to the data transmission method and device in the embodiments of the present disclosure, the transmitting end performs the precoding processing on the data stream in accordance with the first precoding matrix and the second precoding matrix. The first precoding matrix is selected from the predefined first code book and it is independent of the channel from the transmitting end to the receiving end. When the data is transmitted in a scenario where the UE moves at a high speed, it is able to ensure the acquired channel state information to match an actual channel state, thereby to prevent the system performance from being deteriorated. In addition, the second precoding matrix is acquired on the basis of the CSI and it is related to the channel from the transmitting end to the receiving end. In the case of data transmission, it is able to adaptively adjust a transmission parameter in accordance with a channel change, thereby to acquire a beamforming gain and a precoding gain and improve the system performance.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
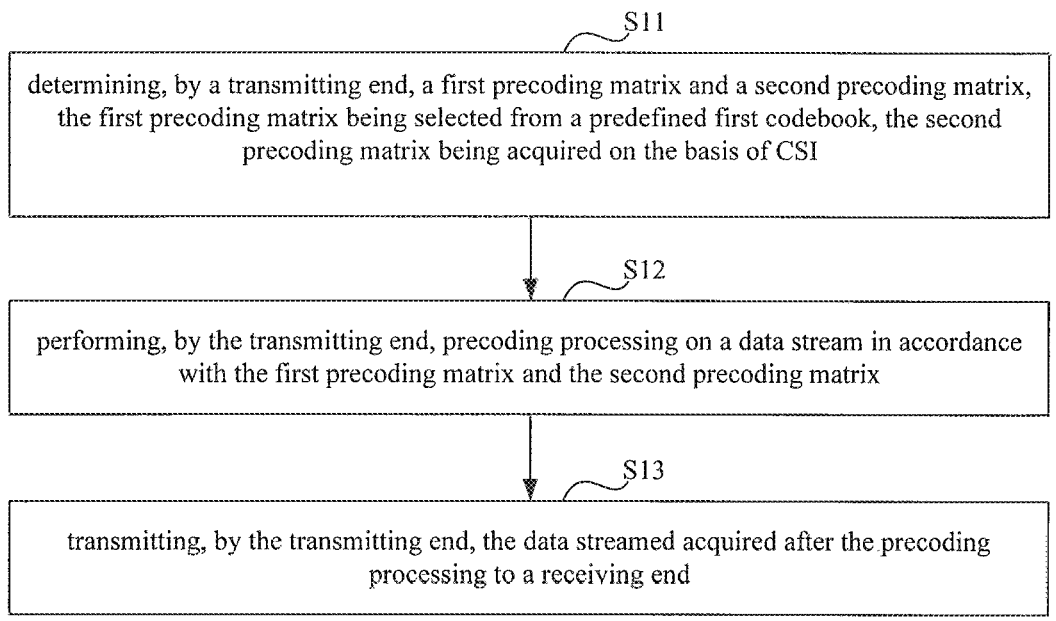
FIG. 1 is a flow chart of a data transmission method according to one embodiment of the present disclosure.

The present disclosure provides in some embodiments a data transmission method which, as shown in FIG. 1, includes: Step S11 of determining, by a transmitting end, a first precoding matrix and a second precoding matrix, the first precoding matrix being selected from a predefined first codebook, the second precoding matrix being acquired on the basis of CSI; Step S12 of performing, by the transmitting end, precoding processing on a data stream in accordance with the first precoding matrix and the second precoding matrix; and Step S13 of transmitting, by the transmitting end, the data streamed acquired after the precoding processing to a receiving end.

According to the data transmission method in the embodiments of the present disclosure, the transmitting end performs the precoding processing on the data stream in accordance with the first precoding matrix and the second precoding matrix. The first precoding matrix is selected from the predefined first code book and it is independent of the channel from the transmitting end to the receiving end. When the data is transmitted in a scenario where the UE moves at a high speed, it is able to ensure the acquired channel state information to match an actual channel state, thereby to prevent the system performance from being deteriorated. In addition, the second precoding matrix used during the precoding processing is acquired on the basis of the CSI and it is related to the channel from the transmitting end to the receiving end. During data transmission, it is able to adaptively adjust a transmission parameter in accordance with a channel change, thereby to acquire a beamforming gain and a precoding gain and improve the system performance.

In the embodiments of the present disclosure, different resources in a same RB may correspond to a same first precoding matrix or different first precoding matrices. All the resources in the same RB may correspond to a same second precoding matrix, and the second precoding matrices corresponding to different RBs may be same to or different from each other.

The RB may be a Physical Resource Block (PRB) in an LTE system, a sub-band, a part of one PRB, or the like.

In a possible embodiment of the present disclosure, Step S11 of determining, by the transmitting end, the first precoding matrix includes: determining, by the transmitting end, dimensions of the first precoding matrix in accordance with the quantity of the data streams; selecting, by the transmitting end, the first code book which includes precoding matrices each having dimensions same to the dimensions of the first precoding matrix; and with respect to each RE, selecting, by the transmitting end, one precoding matrix from the selected first code book as the first precoding matrix for the RE.

To be specific, the transmitting end may determine the dimensions of the first precoding matrix in accordance with the quantity of the data streams, select from predefined code books a code book which includes precoding matrices each having dimensions same to the determined dimensions, and determine this code book as the first code book. The precoding matrices included in each predefined code book have the same dimensions.

In the embodiments of the present disclosure, the quantity of the data streams refers to the quantity of data streams transmitted independently from the transmitting end (e.g., a base station) to the receiving end (e.g., a UE).

In a possible embodiment of the present disclosure, the step of determining, by the transmitting end, the dimensions of the first precoding matrix in accordance with the quantity of the data streams includes: determining, by the transmitting end, the quantity of columns of the first precoding matrix as the quantity of the data streams; and determining, by the transmitting end, the quantity of rows of the first precoding matrix in accordance with a predetermined mapping relationship between the quantity of the data streams and the quantity of rows of the first precoding matrix.

For example, for the mapping relationship between the quantity of the data streams and the quantity of the rows of the first precoding matrix, when the quantity of the data streams is 1, the quantity of the rows of the first precoding matrix is 1, and when the quantity of the data streams is greater than 1, the quantity of the rows of the first precoding matrix is a minimum even number greater than or equal to the quantity of the data streams or a minimum value of a power of 2 greater than or equal to the number of the data streams.

For example, a possible mapping relationship between the quantity of the data streams and the quantity of the rows of the first precoding matrix is shown in Table 1.

TABLE 1

| The quantity r of data streams | The quantity $M_1$ of rows of first precoding matrix |
|---|---|
| 1 | 1 |
| 2 | 2 |
| 3 | 4 |
| 4 | 4 |
| 5 | 6 |
| 6 | 6 |
| 7 | 8 |
| 8 | 8 |

In Table 1, when the quantity of the data streams is greater than 1, the quantity of the rows of the first precoding matrix may be the minimum even quantity greater than or equal to the quantity of the data streams.

For another example, another possible mapping relationship between the quantity of the data streams and the quantity of the rows of the first precoding matrix is shown in Table 2.

TABLE 2

| The quantity r of data streams | The quantity $M_1$ of rows of first precoding matrix |
|---|---|
| 1 | 1 |
| 2 | 2 |
| 3 | 4 |
| 4 | 4 |
| 5 | 8 |
| 6 | 8 |
| 7 | 8 |
| 8 | 8 |

In Table 2, when the quantity of the data streams is greater than 1, the quantity of the rows of the first precoding matrix may be the minimum value of the power of 2 greater than or equal to the quantity of the data streams.

Of course, the mapping relationship between the quantity of the data streams and the quantity of rows of the first precoding matrix may not be limited to the above two possible forms. For example, the quantity of the rows of the first precoding matrix may be equal to the quantity of the data streams.

The step of selecting, by the transmitting end, one precoding matrix from the selected first code book as the first precoding matrix for the RE may be implemented in the following three possible modes.

Mode 1: the transmitting end may select one precoding matrix from the selected first code book as the first precoding matrix in accordance with a serial number of the RE.

For example, with respect to a $k^{th}$ RE in a RB, the transmitting end may select an $n^{th}$ (n=k mod N) precoding matrix from the selected first code book as the first precoding matrix, where mod represents a modulo operation, k=0, 1, . . . , K−1, K represents the quantity of the REs included in the RB, n=0, 1, . . . , N−1, and N represents the quantity of the precoding matrices included in the selected first code book.

For another example, with respect to the $k^{th}$ RE in the RB, the transmitting end may select an $n^{th}$ (n=ceil (k/v) mod N) precoding matrix from the selected first code book as the first precoding matrix, where ceil (k/v) represents a minimum integer greater than or equal to k/v, mod represents a modulo operation, k=0, 1, . . . , K−1, K represents the quantity of the REs included in the RB, n=0, 1, N−1, N represents the quantity of the precoding matrices included in the selected first code book, and v represents a positive integer.

For yet another example, when the data stream transmitted from the transmitting end to the receiving end occupies a plurality of, e.g., Q, RBs, all the REs in these Q RBs may be numbered. With respect to the $k^{th}$ RE, the transmitting end may select an $n^{th}$ (n=k mod N) precoding matrix from the selected first code book as the first precoding matrix, where mod represents a modulo operation, k=0, 1, K'−1, K' represents the quantity of the REs included in the Q RBs, n=0, 1, . . . , N−1, and N represents the quantity of the precoding matrices included in the selected first code book.

For still yet another example, with respect to the $k^{th}$ RE in the RBs, the transmitting end may select an $n^{th}$ (n=cell (k/v) mod N) precoding matrix from the selected first code book as the first precoding matrix, where ceil (k/v) represents a minimum integer greater than or equal to k/v, mod represents a modulo operation, k=0, 1, . . . , K'−1, K' represents the quantity of the REs included in the Q RBs, n=0, 1, . . . , N−1, N represents the quantity of the precoding matrices included in the selected first code book, and v represents a positive integer.

In a possible embodiment of the present disclosure, v may have a value same to the quantity of the data streams, the quantity of antenna ports at the transmitting end, or the quantity of the REs in the RB.

Mode 2: the transmitting end may select one precoding matrix from the selected first code book as the first precoding matrix in accordance with a serial number of a RB to which the RE belongs.

For example, when the data stream transmitted from the transmitting end to the receiving end occupies a plurality of, e.g., Q, RBs, with each RE in a $q^{th}$ RB, the transmitting end may select an $n^{th}$ (n=ceil (q/v) mod N) precoding matrix from the selected first code book as the first precoding matrix, where ceil (q/v) represents a minimum integer greater than or equal to q/v, mod represents a modulo operation, q=0, 1, . . . , Q−1, n=0, 1, . . . , N−1, N represents the quantity of the precoding matrices in the selected first code book, and v represents a positive integer.

For another example, with respect to each RE in the $q^{th}$ RB, the transmitting end may select an $n^{th}$ (n=q mod N) precoding matrix from the selected first code book as the first precoding matrix.

Mode 3: the transmitting end may select one precoding matrix from the selected first code book as the first precoding matrix in accordance with a serial number of a data symbol vector included in the data stream transmitted on the RE.

For example, with respect to an $i^{th}$ data symbol vector in the data stream, the transmitting end may select an $n^{th}$ (n=i mod N) precoding matrix from the selected first code book as the first precoding matrix, where mod represents a modulo operation, i=0, 1, ..., I-1, I represents the quantity of the data symbol vectors in the data stream, n=0, 1, ..., N-1, and N represents the quantity of the precoding matrices in the selected first code book.

For another example, with respect to the $i^{th}$ data symbol vector in the data stream, the transmitting end may select an $n^{th}$ (n=ceil (i/v) mod N) precoding matrix from the selected first code book as the first precoding matrix, where ceil (i/v) represents a minimum integer greater than or equal to i/v, mod represents a modulo operation, i=0, 1, ..., I-1, I represents the quantity of the data symbol vectors in the data stream, n=0, 1, ..., N-1, N represents the quantity of the precoding matrices in the selected first code book, and v represents the quantity of the data streams or the quantity of the antenna ports at the transmitting end.

For example, during the transmission of two data streams (i.e., a rank r is 2), when the selected first code book includes two precoding matrices, possible precoding matrices in the first code book may include $$\begin{bmatrix} 1 & 1 \\ 1 & -1 \end{bmatrix}, \begin{bmatrix} 1 & 1 \\ -1 & 1 \end{bmatrix}.$$

When the selected first code book includes four precoding matrices, the possible precoding matrices in the first code book may include $$\begin{bmatrix} 1 & 1 \\ 1 & -1 \end{bmatrix}, \begin{bmatrix} 1 & 1 \\ -1 & 1 \end{bmatrix}, \begin{bmatrix} 1 & 1 \\ j & -j \end{bmatrix} \text{ and } \begin{bmatrix} 1 & 1 \\ -j & j \end{bmatrix},$$

where $j=\sqrt{-1}$. Of course, the precoding matrices in the selected first code book may also be diagonal matrices or column-exchange matrices, e.g., $$\begin{bmatrix} 1 & 0 \\ 0 & 1 \end{bmatrix} \text{ and } \begin{bmatrix} 0 & 1 \\ 1 & 0 \end{bmatrix}.$$

For example, during the transmission of four data streams (i.e., r=4), when the selected first code book includes four precoding matrices, possible precoding matrices in the first code book may include $$\begin{bmatrix} 1 & 1 & 1 & -1 \\ 1 & 1 & -1 & 1 \\ 1 & -1 & 1 & 1 \\ -1 & 1 & 1 & 1 \end{bmatrix}, \begin{bmatrix} 1 & 1 & -1 & 1 \\ 1 & 1 & 1 & -1 \\ -1 & 1 & 1 & 1 \\ 1 & -1 & 1 & 1 \end{bmatrix}, \begin{bmatrix} 1 & -1 & 1 & 1 \\ -1 & 1 & 1 & 1 \\ 1 & 1 & 1 & -1 \\ 1 & 1 & -1 & 1 \end{bmatrix} \text{ and }$$

$$\begin{bmatrix} 1 & -1 & -1 & -1 \\ -1 & 1 & -1 & -1 \\ -1 & -1 & 1 & -1 \\ -1 & -1 & -1 & 1 \end{bmatrix}.$$

Of course, the precoding matrices in the selected first code book may also be diagonal matrices or column-exchange matrices, e.g., $$\begin{bmatrix} 1 & 1 & 0 & 0 \\ 1 & -1 & 0 & 0 \\ 0 & 0 & 1 & 1 \\ 0 & 0 & 1 & -1 \end{bmatrix}, \begin{bmatrix} 1 & 1 & 0 & 0 \\ -1 & 1 & 0 & 0 \\ 0 & 0 & 1 & 1 \\ 0 & 0 & -1 & 1 \end{bmatrix}, \begin{bmatrix} 0 & 0 & 1 & 1 \\ 0 & 0 & 1 & -1 \\ 1 & 1 & 0 & 0 \\ 1 & -1 & 0 & 0 \end{bmatrix} \text{ and }$$

$$\begin{bmatrix} 0 & 0 & 1 & 1 \\ 0 & 0 & -1 & 1 \\ 1 & 1 & 0 & 0 \\ -1 & 1 & 0 & 0 \end{bmatrix}; \text{ or } \begin{bmatrix} 1 & 0 & 0 & 0 \\ 0 & 1 & 0 & 0 \\ 0 & 0 & 1 & 0 \\ 0 & 0 & 0 & 1 \end{bmatrix}, \begin{bmatrix} 0 & 0 & 0 & 1 \\ 1 & 0 & 0 & 0 \\ 0 & 1 & 0 & 0 \\ 0 & 0 & 1 & 0 \end{bmatrix}, \begin{bmatrix} 0 & 0 & 1 & 0 \\ 0 & 0 & 0 & 1 \\ 1 & 0 & 0 & 0 \\ 0 & 1 & 0 & 0 \end{bmatrix} \text{ and }$$

$$\begin{bmatrix} 0 & 1 & 0 & 0 \\ 0 & 0 & 1 & 0 \\ 0 & 0 & 0 & 1 \\ 1 & 0 & 0 & 0 \end{bmatrix}.$$

In the embodiments of the present disclosure, the quantity of the precoding matrices in the first code book and the forms of the precoding matrices will not be particularly defined.

The step of determining, by the transmitting end, the second precoding matrix may be implemented in the following two possible modes.

Mode 1: the transmitting end may perform channel estimation in accordance with a signal from the receiving end so as to acquire a channel matrix, and determine the second precoding matrix in accordance with the channel matrix.

For example, the base station may perform estimation on an uplink signal from the UE so as to acquire a channel matrix for an uplink channel, then convert the channel matrix into a channel matrix for a downlink channel based on channel reciprocity, and then acquire the second precoding matrix in accordance with the channel matrix for the downlink channel.

Mode 2: upon the receipt of the CSI reported by the receiving end, the transmitting end may determine the second precoding matrix in accordance with the CSI. The CSI is acquired by the receiving end after measuring a channel from the transmitting end to the receiving end.

The CSI reported by the receiving end may be index information about the second precoding matrix in a second code book, i.e., a PMI of the second precoding matrix.

For example, the receiving end may measure the channel from the transmitting end to the receiving end in accordance with a Channel State Information-Reference Signal (CRI-RS) so as to acquire the CSI, then select one precoding matrix from the predefined second code book as the second precoding matrix, and then report the index information about the second precoding matrix in the second code book to the transmitting end.

Step 13 of performing, by the transmitting end, the precoding processing on the data stream in accordance with the first precoding matrix and the second precoding matrix may be implemented in the following two possible modes.

Mode A: the transmitting end may perform first-level precoding processing on the data stream in accordance with the first precoding matrix, and perform second-level precoding processing on the data stream acquired after the first-level precoding processing in accordance with the second precoding matrix.

For example, when an output from the transmitting end after the first-level precoding processing on the data stream is y and y is a vector having a length of t, $y=[y_1, y_2, y_3, \ldots, y_t]^T$, where t is an integer greater than or equal to 1. With respect to y, an output from the transmitting end after the second-level precoding processing is $$z = \begin{bmatrix} V_{2,1} y_1 \\ V_{2,2} y_2 \\ \vdots \\ V_{2,t} y_t \end{bmatrix}$$

(where $[V_{2,1}, V_{2,2}, \ldots, V_{2,t}]^T$ represents a possible form of the second precoding matrix corresponding to one RB), or $$z = \underbrace{\begin{bmatrix} V_{2,1} & D & \ldots & D \\ D & V_{2,2} & \ldots & D \\ \vdots & \vdots & \ddots & \vdots \\ D & D & \ldots & V_{2,t} \end{bmatrix}}_{W} \begin{bmatrix} y_1 \\ y_2 \\ \vdots \\ y_t \end{bmatrix} = Wy$$

(where W represents a possible form of the second precoding matrix corresponding to one RB, and D represents a matrix including elements which are all 0).

Mode B: the transmitting end may determine a third precoding matrix in accordance with the first precoding matrix and the second precoding matrix, and perform the precoding processing on the data stream in accordance with the third precoding matrix.

In a possible embodiment of the present disclosure, the transmitting end may determine a product of a Kronecker product of the first precoding matrix and the second precoding matrix as the third precoding matrix.

For example, when the first precoding matrix and the second precoding matrix on any RE are represented by $U_1$ and $U_2$, the third precoding matrix on the RE may be $U=U_1 \otimes U_2$, $U=U_2 \otimes U_1$, $U=U_2 U_1$ or $U=U_1 U_2$.

When $U_2$ on any RE is a block diagonal matrix, i.e., $$U_2 = \begin{bmatrix} X_1 & 0 \\ 0 & X_2 \end{bmatrix},$$

the third precoding matrix on the RE may be $$U_1 \otimes \begin{bmatrix} X_1 & 0 \\ 0 & X_2 \end{bmatrix}, \begin{bmatrix} X_1 & 0 \\ 0 & X_2 \end{bmatrix} \otimes U_1, U_1 \begin{bmatrix} X_1 & 0 \\ 0 & X_2 \end{bmatrix} \text{ or } \begin{bmatrix} X_1 & 0 \\ 0 & X_2 \end{bmatrix} U_1,$$

where $X_1$, $X_2$ each represent a vector or matrix.

In the embodiments of the present disclosure, a form of the second precoding matrix will not be particularly defined, and apart from the above-mentioned two possible forms, the second precoding matrix may also be in the other forms, e.g., the second precoding matrix may consist of a vector group.

For example, the vector group includes M column vectors, i.e., $\{V_1, V_2, \ldots, V_M\}$, where M is an integer greater than or equal to 1. When M=2, a possible form of the second precoding matrix may be $$U_2 = \begin{bmatrix} V_1 & 0 & V_2 & 0 \\ 0 & V_1 & 0 & V_2 \end{bmatrix},$$

and when M=4, a possible form of the second precoding matrix may be $$U_2 = \begin{bmatrix} V_1 & 0 & V_3 & 0 \\ 0 & V_2 & 0 & V_4 \end{bmatrix}.$$

In a possible embodiment of the present disclosure, the data transmission method may further include performing, by the transmitting end, precoding processing on a pilot signal in accordance with the second precoding matrix. The step of transmitting, by the transmitting end, the data stream acquired after the precoding processing to the receiving end may include transmitting, by the transmitting end, the pilot signal acquired after the precoding processing to the receiving end.

To be specific, the precoding processing may be performed on the pilot signal transmitted together with the data stream (i.e., a demodulation pilot signal) using the second precoding matrix corresponding to the RB on which the pilot signal is transmitted. In other words, the first-level precoding processing is not performed on the pilot signal, or the precoding matrix used by the first-level precoding processing on the pilot signal is a unit matrix.

For example, pilot signals for a first pilot signal port, a second pilot signal port, . . . , and a $t^{th}$ pilot signal port are $p_1, p_2, \ldots, p_t$, where t is an integer greater than or equal to 1. When the second precoding matrix includes column vectors, an output after the precoding processing on the pilot signal in accordance with the second precoding matrix may be $$q = \begin{bmatrix} U_2 p_1 \\ U_2 p_2 \\ \vdots \\ U_2 p_t \end{bmatrix} \text{ or } q = \begin{bmatrix} V_{2,1} p_1 \\ V_{2,2} p_2 \\ \vdots \\ V_{2,t} p_t \end{bmatrix},$$

where $U_2$ represents the second precoding matrix, and $[V_{2,1}, V_{2,2}, \ldots, V_{2,t}]^T$ represents the second precoding matrix.

When the second precoding matrix is a block diagonal matrix, an output after the precoding processing on the pilot signal using the second precoding matrix may be $$q = U_2 \begin{bmatrix} p_1 \\ p_2 \\ \vdots \\ p_t \end{bmatrix} = \begin{bmatrix} X_1 & 0 & \ldots & 0 \\ 0 & X_2 & \ldots & 0 \\ \vdots & \vdots & \ddots & \vdots \\ 0 & \ldots & \ldots & X_t \end{bmatrix} \begin{bmatrix} p_1 \\ p_2 \\ \vdots \\ p_t \end{bmatrix} \text{ or }$$

$$q = W \begin{bmatrix} p_1 \\ p_2 \\ \vdots \\ p_t \end{bmatrix} = \begin{bmatrix} V_{2,1} & D & \ldots & D \\ D & V_{2,2} & \ldots & D \\ \vdots & \vdots & \ddots & \vdots \\ D & D & \ldots & V_{2,t} \end{bmatrix} \begin{bmatrix} p_1 \\ p_2 \\ \vdots \\ p_t \end{bmatrix},$$

where $p_1, p_2, \ldots, p_t$ represent the pilot signals for the first, second, . . . , $t^{th}$ pilot signal ports, and $U_2$ and W represent possible forms of the second precoding matrices corresponding to one RB.

In a possible embodiment of the present disclosure, the data transmission method further includes transmitting, by the transmitting end, control signaling to the receiving end, and the control signaling includes the quantity of ports for the pilot signal and/or the quantity of the data streams.

The quantity of the ports for the pilot signals is same to the quantity of the data streams outputted after the precoding processing on the pilot signal in accordance with the second precoding matrix, and the quantity of the data streams included in the control signaling may be same to the quantity of the data streams inputted prior to the precoding processing.

In a possible embodiment of the present disclosure, when performing the precoding processing on the pilot signal, the transmitting end may perform the precoding processing on the pilot signal in accordance with the first precoding matrix and the second precoding matrix, i.e., the precoding processing may be performed on the pilot signal in a way same to the precoding processing on the data streams transmitted on a RB on which the pilot signal is transmitted. The specific precoding processing may refer to that mentioned above, and thus will not be particularly defined herein. Correspondingly, when transmitting the data stream acquired after the precoding processing to the receiving end, the data transmission method further includes transmitting, by the transmitting end, the pilot signal acquired after the precoding processing to the receiving end.

Figure 2:
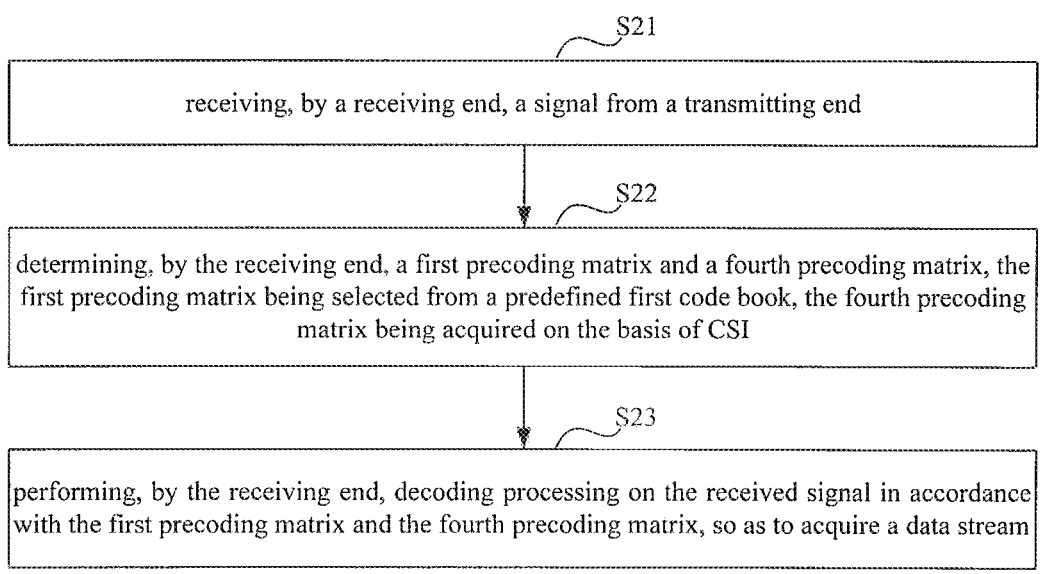
FIG. 2 is a flow chart of a data reception method according to one embodiment of the present disclosure.

Based on a same inventive concept, the present disclosure further provides in some embodiments a data reception method which, as shown in FIG. 2, includes: Step S21 of receiving, by a receiving end, a signal from a transmitting end; Step S22 of determining, by the receiving end, a first precoding matrix and a fourth precoding matrix, the first precoding matrix being selected from a predefined first code book, the fourth precoding matrix being acquired on the basis of CSI; and Step S23 of performing, by the receiving end, decoding processing on the received signal in accordance with the first precoding matrix and the fourth precoding matrix, so as to acquire a data stream.

In a possible embodiment of the present disclosure, prior to the step of performing, by the receiving end, the channel estimation on the pilot signal in the received signal, the data reception method further includes receiving, by the receiving end, control signaling from the transmitting end, and the control signaling includes the quantity of ports for the pilot signal and/or the quantity of the data streams. The quantity of the ports for the pilot signals is equal to the quantity of the data streams outputted after the precoding processing on the pilot signal in accordance with the second precoding matrix, and the quantity of the data streams in the control signaling is same to the quantity of the data streams inputted prior to two levels of precoding processing.

In the embodiments of the present disclosure, the modes of determining the first precoding matrix by the receiving end may refer to those mentioned above, and thus will not be particularly defined herein.

In a possible embodiment of the present disclosure, the step of determining, by the receiving end, the fourth precoding matrix includes: performing, by the receiving end, channel estimation based on a pilot signal in the received signal, and determining a resultant channel matrix as the fourth precoding matrix; or measuring, by the receiving end, a channel from the transmitting end to the receiving end, and selecting one precoding matrix from a predefined second code book as the fourth precoding matrix in accordance with the resultant CSI; or receiving, by the receiving end, index information from the transmitting end, and determining a precoding matrix in the predefined second code book corresponding to the index information as the fourth precoding matrix in accordance with the index information.

In a possible embodiment of the present disclosure, the receiving end may perform the decoding processing on the received signal in accordance with the first precoding matrix and the fourth precoding matrix in the following two possible modes.

Mode 1: the receiving end may perform first-level decoding processing on the received signal in accordance with the fourth precoding matrix, and perform second-level decoding processing on the signal acquired after the first-level decoding processing in accordance with the first precoding matrix.

Mode 2: the receiving end may determine a fifth precoding matrix in accordance with the first precoding matrix and the fourth precoding matrix, and perform the decoding processing on the received signal in accordance with the fifth precoding matrix.

For example, the receiving end may determine a product or a Kronecker product of the first precoding matrix and the fourth precoding matrix as the fifth precoding matrix, and then perform the decoding processing on the received signal in accordance with the fifth precoding matrix.

The data transmission method will be described hereinafter in more details from the perspective of both the transmitting end and the receiving end.

When the transmitting end is a base station and the receiving end is a UE, the data transmission procedure will be described as follows.

At first, at a base station side, the base station may select one precoding matrix from precoding matrices in a predefined first code book as the first precoding matrix in accordance with a predetermined rule, and determine the second precoding matrix.

The base station may perform estimation on an uplink signal from the UE to acquire a channel matrix for an uplink channel, convert the channel matrix for the uplink channel into a channel matrix for a downlink channel based on channel reciprocity, and calculate the second precoding matrix in accordance with the channel matrix for the downlink channel. In a possible embodiment of the present disclosure, the base station may receive information about the second precoding matrix returned by the UE after channel measurement, and determine the second precoding matrix in accordance with the information returned by the UE.

Next, the base station may perform two levels of precoding processing on the data stream in accordance with the first precoding matrix and the second precoding matrix, and perform the precoding processing on a demodulation pilot signal in accordance with the second precoding matrix.

Next, the base station may transmit control signaling to the UE, and the control signaling includes the quantity of ports for the pilot signal and/or the quantity of the data streams.

Finally, the base station may map the data stream and the pilot signal acquired after the precoding processing to a corresponding antenna for transmission.

A data transmission procedure at a UE side will be described as follows.

At first, the UE may receive a signal from the transmission end. Next, the UE may receive control signaling from the transmission end, and the control signaling includes the quantity of ports for the pilot signal and/or the quantity of data streams. Next, the UE may select one precoding matrix from precoding matrix in the predefined first code book as the first precoding matrix in accordance with a predetermined rule. Next, the UE may perform channel estimation on the pilot signal in the received signal, and determine a resultant channel matrix as the fourth precoding matrix. Finally, the UE may determine a product of the first precoding matrix and the fourth precoding matrix as the fifth precoding matrix, and perform the decoding processing on the received signal in accordance with the fifth precoding matrix.

The above procedures may be implemented by a software program which may be stored in a storage medium. The software program is called so as to execute the above-mentioned steps.

Figure 3:
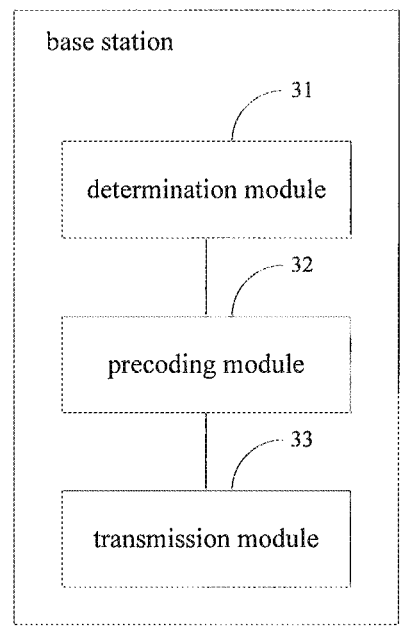
FIG. 3 is a schematic view showing a data transmission device according to one embodiment of the present disclosure.

Based on a same inventive concept, the present disclosure further provides in some embodiments a data transmission device which, as shown in FIG. 3, includes: a determination module 31 configured to determine a first precoding matrix and a second precoding matrix, the first precoding matrix being selected from a predefined first codebook, the second precoding matrix being acquired on the basis of CSI; a precoding module 32 configured to perform precoding processing on a data stream in accordance with the first precoding matrix and the second precoding matrix; and a transmission module 33 configured to transmit the data stream acquired after the precoding processing to a receiving end.

In a possible embodiment of the present disclosure, the precoding module 32 is further configured to: perform first-level precoding processing on the data stream in accordance with the first precoding matrix, and perform second-level precoding processing on the data stream acquired after the first-level precoding processing in accordance with the second precoding matrix; or determine a third precoding matrix in accordance with the first precoding matrix and the second precoding matrix, and perform the precoding processing on the data stream in accordance with the third precoding matrix.

In a possible embodiment of the present disclosure, the precoding module 32 is further configured to perform precoding processing on a pilot signal in accordance with the second precoding matrix, and the transmission module 33 is further configured to transmit the pilot signal acquired after the precoding processing to the receiving end.

In a possible embodiment of the present disclosure, the transmission module 33 is further configured to transmit control signaling to the receiving end, and the control signaling includes the quantity of ports for the pilot signal and/or the quantity of the data streams.

In a possible embodiment of the present disclosure, the determination module 31 is further configured to: determine dimensions of the first precoding matrix in accordance with the quantity of the data streams; select the first code book which includes precoding matrices each having dimensions same to the first precoding matrix in accordance with the dimensions of the first precoding matrix; and with respect to each RE, select one precoding matrix from the selected first code book as the first precoding matrix for the RE.

In a possible embodiment of the present disclosure, the determination module 31 is further configured to: determine the quantity of columns of the first precoding matrix as the quantity of the data streams; and determine the quantity of rows of the first precoding matrix in accordance with a predetermined mapping relationship between the quantity of the data streams and the quantity of rows of the first precoding matrix.

In a possible embodiment of the present disclosure, the determination module 31 is further configured to: select one precoding matrix from the selected first code book as the first precoding matrix in accordance with a serial number of the RE or a serial number of a RB to which the RE belongs; or select one precoding matrix from the selected first code book as the first precoding matrix in accordance with a serial number of a data symbol vector included in the data stream transmitted on the RE.

In a possible embodiment of the present disclosure, the determination module 31 is further configured to: perform channel estimation in accordance with a signal from the receiving end so as to acquire a channel matrix, and determine the second precoding matrix in accordance with the channel matrix; or upon the receipt of the CSI reported by the receiving end, determine the second precoding matrix in accordance with the CSI, the CSI being acquired by the receiving end after measuring a channel from the transmitting end to the receiving end.

Figure 4:
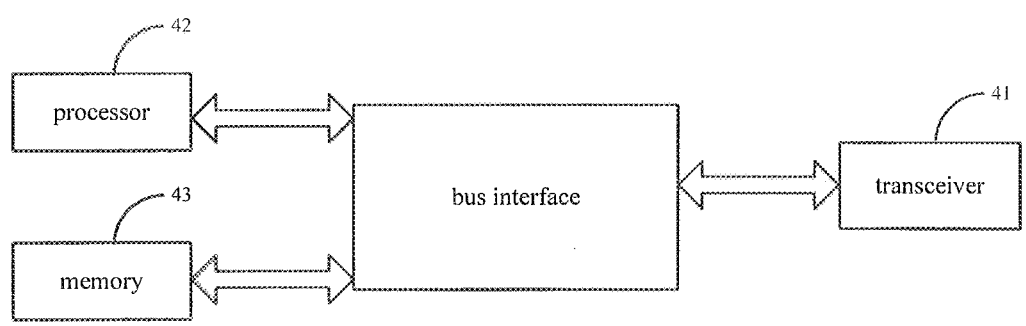
FIG. 4 is a schematic view showing a base station according to one embodiment of the present disclosure.

Based on a same inventive concept, the present disclosure further provides in some embodiments a base station which, as shown in FIG. 4, includes a transceiver 41 and at least one processor 42 connected to the transceiver 41. The processor 42 is configured to read a program stored in a memory 43, so as to: determine a first precoding matrix and a second precoding matrix, the first precoding matrix being selected from a predefined first codebook, the second precoding matrix being acquired on the basis of CSI; perform precoding processing on a data stream in accordance with the first precoding matrix and the second precoding matrix; and transmit through the transceiver 41 the data streamed acquired after the precoding processing to a receiving end.

In FIG. 4, bus architecture may include any quantity of buses and bridges connected to each other, so as to connect various circuits for one or more processors 42 and one or more memories 43. In addition, as is known in the art, the bus architecture may be used to connect any other circuits, such as a circuit for a peripheral device, a circuit for a voltage stabilizer and a power management circuit, which are not particularly defined herein. Bus interfaces are provided, and the transceiver 41 may be in communication with any other devices over a transmission medium. The processor 42 may take charge of managing the bus architecture as well as general processing. The memory 43 may store therein data for the operation of the processor 42.

In a possible embodiment of the present disclosure, the processor 42 is further configured to: perform first-level precoding processing on the data stream in accordance with the first precoding matrix, and perform second-level precoding processing on the data stream acquired after the first-level precoding processing in accordance with the second precoding matrix; or determine a third precoding matrix in accordance with the first precoding matrix and the second precoding matrix, and perform the precoding processing on the data stream in accordance with the third precoding matrix.

In a possible embodiment of the present disclosure, the processor 42 is further configured to perform precoding processing on a pilot signal in accordance with the second precoding matrix, and transmit through the transceiver 41 the pilot signal acquired after the precoding processing to the receiving end.

In a possible embodiment of the present disclosure, the processor 42 is further configured to transmit through the transceiver 41 a control signaling to the receiving end, and the control signaling includes the quantity of ports for the pilot signal and/or the quantity of the data streams.

In a possible embodiment of the present disclosure, the processor 42 is further configured to: determine dimensions of the first precoding matrix in accordance with the quantity of the data streams; select the first code book which includes precoding matrices each having dimensions same to the first precoding matrix in accordance with the dimensions of the first precoding matrix; and with respect to each RE, select one precoding matrix from the selected first code book as the first precoding matrix for the RE.

In a possible embodiment of the present disclosure, the processor 42 is further configured to: determine the quantity of columns of the first precoding matrix as the quantity of the data streams; and determine the quantity of rows of the first precoding matrix in accordance with a predetermined mapping relationship between the quantity of the data streams and the quantity of rows of the first precoding matrix.

In a possible embodiment of the present disclosure, the processor 42 is further configured to: select one precoding matrix from the selected first code book as the first precoding matrix in accordance with a serial number of the RE or a serial number of a RB to which the RE belongs; or select one precoding matrix from the selected first code book as the first precoding matrix in accordance with a serial number of a data symbol vector included in the data stream transmitted on the RE.

In a possible embodiment of the present disclosure, the processor 42 is further configured to: perform channel estimation in accordance with a signal from the receiving end so as to acquire a channel matrix, and determine the second precoding matrix in accordance with the channel matrix; or upon the receipt of the CSI reported by the receiving end through the transceiver, determine the second precoding matrix in accordance with the CSI, the CSI being acquired by the receiving end after measuring a channel from the transmitting end to the receiving end.

Figure 5:
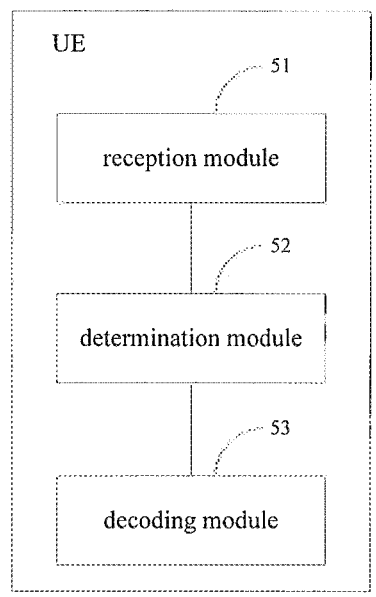
FIG. 5 is a schematic view showing a data reception device according to one embodiment of the present disclosure.

Based on a same inventive concept, the present disclosure further provides in some embodiments a data reception device which, as shown in FIG. 5, includes: a reception module 51 configured to receive a signal from a transmitting end; a determination module 52 configured to determine a first precoding matrix and a fourth precoding matrix, the first precoding matrix being selected from a predefined first code book, the fourth precoding matrix being acquired on the basis of CSI; and a decoding module 53 configured to perform decoding processing on the received signal in accordance with the first precoding matrix and the fourth precoding matrix, so as to acquire a data stream.

In a possible embodiment of the present disclosure, the decoding module 53 is further configured to: perform first-level decoding processing on the received signal in accordance with the fourth precoding matrix, and perform second-level decoding processing on the signal acquired after the first-level decoding processing in accordance with the first precoding matrix; or determine a fifth precoding matrix in accordance with the first precoding matrix and the fourth precoding matrix, and perform the decoding processing on the received signal in accordance with the fifth precoding matrix.

In a possible embodiment of the present disclosure, the the determination module 52 is further configured to determine a product of the first precoding matrix and the fourth precoding matrix as the fifth precoding matrix.

In a possible embodiment of the present disclosure, the determination module 52 is further configured to: perform channel estimation based on a pilot signal in the received signal, and determine a resultant channel matrix as the fourth precoding matrix; or measure a channel from the transmitting end to the receiving end, and select one precoding matrix from a predefined second code book as the fourth precoding matrix in accordance with the resultant CSI; or after the reception module 51 has received index information from the transmitting end, determine a precoding matrix in the predefined second code book corresponding to the index information as the fourth precoding matrix in accordance with the index information.

In a possible embodiment of the present disclosure, the reception module 51 is further configured to receive a control signaling from the transmitting end, and the control signaling includes the quantity of ports for the pilot signal and/or the quantity of the data streams.

In a possible embodiment of the present disclosure, the determination module 52 is further configured to: determine dimensions of the first precoding matrix in accordance with the quantity of the ports for the pilot signal and/or the quantity of the data streams; select the first code book which includes precoding matrices each having dimensions same to the first precoding matrix in accordance with the dimensions of the first precoding matrix; and with respect to each RE, select one precoding matrix from the selected first code book as the first precoding matrix for the RE.

In a possible embodiment of the present disclosure, the determination module 52 is further configured to: determine the quantity of columns of the first precoding matrix as the quantity of the data streams; and determine the quantity of rows of the first precoding matrix in accordance with a predetermined mapping relationship between the quantity of the data streams and the quantity of the rows of the first precoding matrix.

In a possible embodiment of the present disclosure, the determination module 52 is further configured to: select one precoding matrix from the selected first code book as the first precoding matrix for the RE in accordance with a serial number of the RE or a serial number of a RB to which the RE belongs; or select one precoding matrix from the selected first code book as the first precoding matrix for the RE in accordance with a serial number of a data symbol vector included in the data stream transmitted on the RE.

Figure 6:
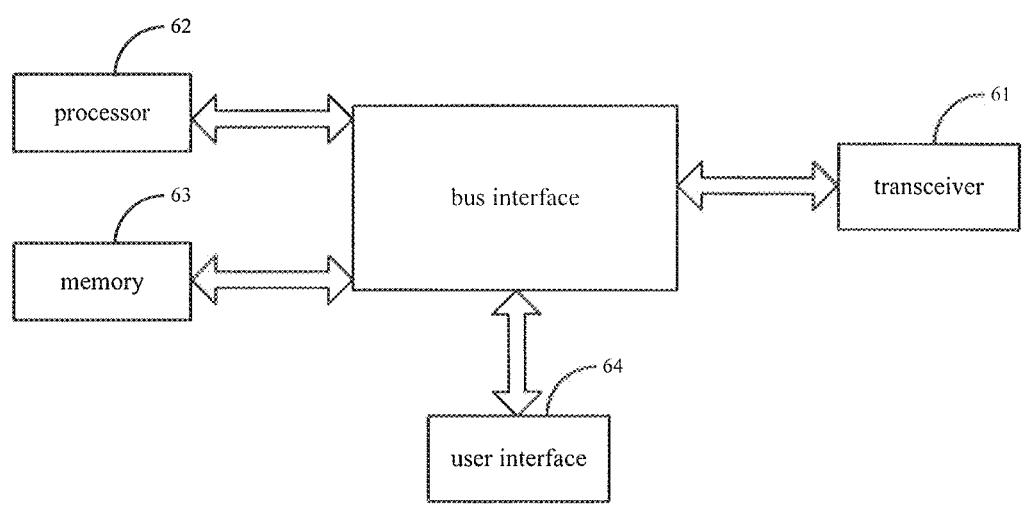
FIG. 6 is a schematic view showing a UE according to one embodiment of the present disclosure.

Based on a same inventive concept, the present disclosure further provides in some embodiments a UE which, as shown in FIG. 6, includes a transceiver 61 and at least one processor 62 connected to the transceiver 61. The processor 62 is configured to read a program stored in a memory 63, so as to: receive through the transceiver 61 a signal from a transmitting end; determine a first precoding matrix and a fourth precoding matrix, the first precoding matrix being selected from a predefined first code book, the fourth precoding matrix being acquired on the basis of CSI; and perform decoding processing on the received signal in accordance with the first precoding matrix and the fourth precoding matrix, so as to acquire a data stream.

In FIG. 6, bus architecture may include any quantity of buses and bridges connected to each other, so as to connect various circuits for one or more processors 62 and one or more memories 63. In addition, as is known in the art, the bus architecture may be used to connect any other circuits, such as a circuit for a peripheral device, a circuit for a voltage stabilizer and a power management circuit. Bus interfaces may be provided, and the transceiver 61 may consist of a plurality of elements, i.e., a transmitter and a receiver for communication with any other devices over a transmission medium. With respect to different UEs, a user interface 64 may also be provided for devices which are to be arranged inside or outside the UE, and these devices may include but not limited to a keypad, a display, a speaker, a microphone and a joystick. The processor 62 may take charge of managing the bus architecture as well as general processing. The memory 63 may store therein data for the operation of the processor 62.

In a possible embodiment of the present disclosure, the processor 62 is further configured to: perform first-level decoding processing on the received signal in accordance with the fourth precoding matrix, and perform second-level decoding processing on the signal acquired after the first-level decoding processing in accordance with the first precoding matrix; or determine a fifth precoding matrix in accordance with the first precoding matrix and the fourth precoding matrix, and perform the decoding processing on the received signal in accordance with the fifth precoding matrix.

In a possible embodiment of the present disclosure, the processor 62 is further configured to determine a product of the first precoding matrix and the fourth precoding matrix as the fifth precoding matrix.

In a possible embodiment of the present disclosure, the processor 62 is further configured to: perform channel estimation based on a pilot signal in the signal received by the transceiver 61, and determine a resultant channel matrix as the fourth precoding matrix; or measure a channel from the transmitting end to the receiving end, and select one precoding matrix from a predefined second code book as the fourth precoding matrix in accordance with the resultant CSI; or receive through the transceiver 61 index information from the transmitting end, and determine a precoding matrix in the predefined second code book corresponding to the index information as the fourth precoding matrix in accordance with the index information.

In a possible embodiment of the present disclosure, the transceiver 61 is further configured to receive a control signaling from the transmitting end, and the control signaling includes the quantity of ports for the pilot signal and/or the quantity of the data streams.

In a possible embodiment of the present disclosure, the processor 62 is further configured to: determine dimensions of the first precoding matrix in accordance with the quantity of the ports for the pilot signal and/or the quantity of the data streams; select the first code book which includes precoding matrices each having dimensions same to the first precoding matrix in accordance with the dimensions of the first precoding matrix; and with respect to each RE, select one precoding matrix from the selected first code book as the first precoding matrix for the RE.

In a possible embodiment of the present disclosure, the processor 62 is further configured to: determine the quantity of columns of the first precoding matrix as the quantity of the data streams; and determine the quantity of rows of the first precoding matrix in accordance with a predetermined mapping relationship between the quantity of the data streams and the quantity of the rows of the first precoding matrix.

In a possible embodiment of the present disclosure, the processor 62 is further configured to: select one precoding matrix from the selected first code book as the first precoding matrix for the RE in accordance with a serial number of the RE or a serial number of a RB to which the RE belongs; or select one precoding matrix from the selected first code book as the first precoding matrix for the RE in accordance with a serial number of a data symbol vector included in the data stream transmitted on the RE.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A data transmission method, comprising:
   determining, by a transmitting end, a first precoding matrix and a second precoding matrix, the first precoding matrix being selected from a predefined first code book, the second precoding matrix being acquired on the basis of Channel State information (CSI);

performing, by the transmitting end, precoding processing on a data stream in accordance with the first precoding matrix and the second precoding matrix;

performing, by the transmitting end, precoding processing on a pilot signal in accordance with the second precoding matrix; and transmitting, by the transmitting end, the data stream and the pilot signal acquired after the precoding processing to a receiving end, wherein the transmitting end is a base station and the receiving end is a UE, wherein the step of determining, by the transmitting end, the first precoding matrix comprises:

determining, by the transmitting end, dimensions of the first precoding matrix in accordance with a quantity of the data streams;

selecting, by the transmitting end, a first code book which comprises precoding matrices each having dimensions same to the dimensions of the first precoding matrix; and with respect to each Resource Element (RE), selecting, by the transmitting end, one precoding matrix from the selected first code book as the first precoding matrix for the RE.

2. The data transmission method according to claim 1, wherein the performing, by the transmitting end, the precoding processing on the data stream in accordance with the first precoding matrix and the second precoding matrix comprises:

performing, by the transmitting end, first-level precoding processing on the data stream in accordance with the first precoding matrix, and performing second-level precoding processing on the data stream acquired after the first-level precoding processing in accordance with the second precoding matrix; or determining, by the transmitting end, a third precoding matrix in accordance with the first precoding matrix and the second precoding matrix, and performing the precoding processing on the data stream in accordance with the third precoding matrix.

3. The data transmission method according to claim 1, further comprising transmitting, by the transmitting end, a control signaling to the receiving end, wherein the control signaling comprises a quantity of ports for the pilot signal and/or a quantity of the data streams.

4. The data transmission method according to claim 1, wherein the determining, by the transmitting end, the dimensions of the first precoding matrix in accordance with the quantity of the data streams comprises:

determining, by the transmitting end, a quantity of columns of the first precoding matrix as the quantity of the data streams; and determining, by the transmitting end, a quantity of rows of the first precoding matrix in accordance with a predetermined mapping relationship between the quantity of the data streams and the quantity of rows of the first precoding matrix.

5. The data transmission method according to claim 1, wherein the selecting, by the transmitting end, one precoding matrix from the selected first code book as the first precoding matrix for the RE comprises:

selecting, by the transmitting end, one precoding matrix from the selected first code book as the first precoding matrix in accordance with a serial number of the RE or a serial number of a Resource Block (RB) to which the RE belongs; or selecting, by the transmitting end, one precoding matrix from the selected first code book as the first precoding matrix in accordance with a serial number of a data symbol vector comprised in the data stream transmitted on the RE.

6. The data transmission method according to claim 4, wherein for the mapping relationship between the quantity of the data streams and the quantity of the rows of the first precoding matrix, when the quantity of the data streams is 1, the quantity of the rows of the first precoding matrix is 1, and when the quantity of the data streams is greater than 1, the quantity of the rows of the first precoding matrix is a minimum even number greater than or equal to the quantity of the data streams or a minimum value of a power of 2 greater than or equal to the quantity of the data streams.

7. The data transmission method according to claim 1, wherein the determining, by the transmitting end, the second precoding matrix comprises:

performing, by the transmitting end, channel estimation in accordance with a signal from the receiving end to acquire a channel matrix, and determining the second precoding matrix in accordance with the channel matrix; or upon the receipt of the CSI reported by the receiving end, determining, by the transmitting end, the second precoding matrix in accordance with the CSI, the CSI being acquired by the receiving end after measuring a channel from the transmitting end to the receiving end.

8. A data transmission device, comprising a transceiver and at least one processor connected to the transceiver, wherein the processor is configured to read a program stored in a memory, so as to: determine a first precoding matrix and a second precoding matrix, the first precoding matrix being selected from a predefined first code book, the second precoding matrix being acquired on the basis of Channel State Information (CSI); perform precoding processing on a data stream in accordance with the first precoding matrix and the second precoding matrix; perform precoding processing on a pilot signal in accordance with the second precoding matrix; and transmit through the transceiver the data stream acquired after the precoding processing to a receiving end, wherein the data transmission device is a base station and the receiving end is a UE, wherein the processor is further configured to:

determine dimensions of the first precoding matrix in accordance with a quantity of the data streams;

select a first code book which comprises precoding matrices each having dimensions same to the dimensions of the first precoding matrix; and with respect to each Resource Element (RE), select one precoding matrix from the selected first code book as the first precoding matrix for the RE.

* * * * *